United States Patent [19]
Mizuno et al.

[11] Patent Number: 5,945,137
[45] Date of Patent: Aug. 31, 1999

[54] DISK PRODUCING APPARATUS FOR MANUFACTURING A PHOTO FILM CASSETTE

[75] Inventors: Kazunori Mizuno; Akira Tomita; Nobuo Sugiyama, all of Kanagawa, Japan

[73] Assignee: Fuji Photo Film Co., Ltd., Kanagawa, Japan

[21] Appl. No.: 08/906,317

[22] Filed: Aug. 5, 1997

Related U.S. Application Data

[62] Division of application No. 08/670,529, Jun. 27, 1996, abandoned.

[30] Foreign Application Priority Data

Jun. 28, 1995 [JP] Japan ................................ 7-161669

[51] Int. Cl.[6] ........................ B29C 51/10; B29C 51/26
[52] U.S. Cl. .................. 425/302.1; 264/522; 264/548; 264/553; 425/384; 425/387.1; 425/388; 425/397; 425/403.1; 425/DIG. 108
[58] Field of Search ........................ 425/290, 296, 425/302.1, 384, 387.1, 388, 397, 403, 403.1, DIG. 108; 264/522, 553, 548

[56] References Cited

U.S. PATENT DOCUMENTS

| | | | |
|---|---|---|---|
| 4,165,357 | 8/1979 | Vetter | 264/553 |
| 4,196,164 | 4/1980 | Ward | 264/553 |
| 4,832,275 | 5/1989 | Robertson | 242/71.1 |
| 4,834,306 | 5/1989 | Robertson et al. | 242/71.1 |
| 4,932,856 | 6/1990 | Merklinghaus et al. | 425/388 |
| 5,211,348 | 5/1993 | Enomoto | 242/71.1 |
| 5,271,577 | 12/1993 | Takahashi et al. | 242/71.16 |
| 5,407,146 | 4/1995 | Takahashi et al. | 242/348 |
| 5,437,828 | 8/1995 | Shimizu et al. | 425/302.1 |

FOREIGN PATENT DOCUMENTS

| | | |
|---|---|---|
| 6-67360 | 3/1994 | Japan . |
| 6-242552 | 9/1994 | Japan . |

*Primary Examiner*—Patrick Ryan
*Assistant Examiner*—Joseph Leyson
*Attorney, Agent, or Firm*—Sughrue, Mion, Zinn, Macpeak & Seas, PLLC

[57] ABSTRACT

In manufacturing a photo film cassette, a disk producing apparatus includes a web supplier which conveys the web from a web roll to the web conveyor. The web conveyor includes two chains which convey the web in an intermittent fashion, and which include pointed portions which serially penetrate an edge portion of the web. A heater disposed upstream from the web conveyor heats the edges of the web. At the heating/forming unit, a heating plate is lowered toward the web at the same time as the female mold is raised toward the web, and the web is squeezed between them before the heating and vacuum/air pressure forming takes. Clampers/coolers disposed upstream and downstream from the heating plate and female mold squeeze the web in fixed fashion to prevent wrinkles on the web. A web/sheet cutter device includes an upper punch above the web and a lower die under the web, which squeeze the web, and cut the web into a sheet having a plurality of disk-like portions. The web is then wound by the web winder and reused later. The sheet cut from the web is separated from the web by a knockout device incorporated in the upper punch, dropped down through the lower die, and stacked on a sheet stacking container disposed on a movable bottom plate.

13 Claims, 12 Drawing Sheets

FIG. 3A
FIG. 3B
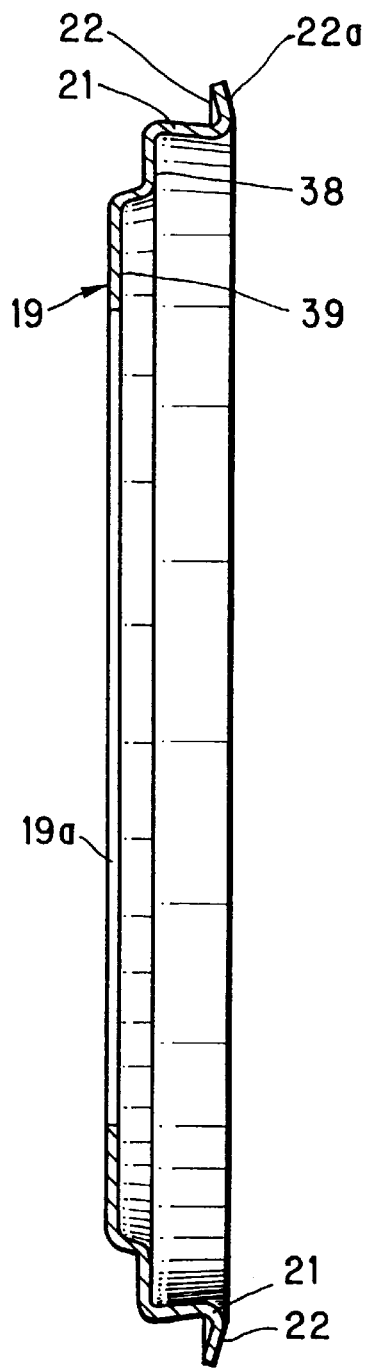
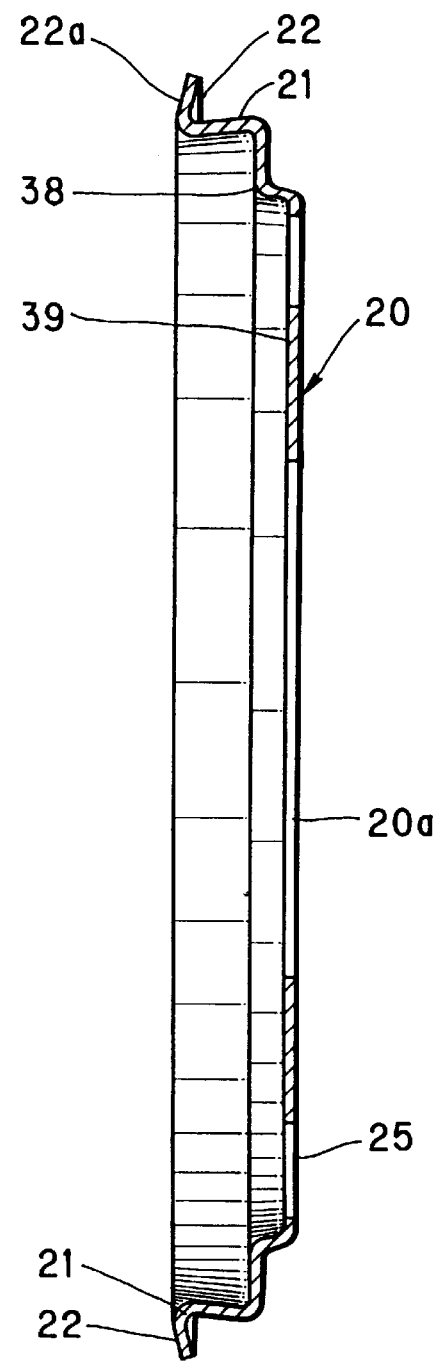

DISK PRODUCING APPARATUS FOR MANUFACTURING A PHOTO FILM CASSETTE

This is a Divisional of application Ser. No. 08/670,529 filed Jun. 27, 1996, now abandoned.

BACKGROUND OF THE INVENTION

1. Field of the Invention

The present invention relates to a disk producing method for a photo film cassette. More particularly, the present invention relates to a disk producing method for a photo film cassette with high precision in size.

2. Description Related to the Prior Art

There is a known photo film cassette in which a leader of photo film is pre-contained in a cassette shell, and rotation of a spool causes the leader to advance through a photo film port to the outside, as disclosed in U.S. Pat. Nos. 4,834,306 and 4,832,275, and U.S. Pat. Nos. 5,271,577 and 5,407,146 (both corresponding to JP-A 3-37645). It is necessary in the cassette to transmit rotation of the spool to a roll of the photo film. The spool has a spool core and disks secured to ends of the spool core. Each of the disks is formed in a shallow cup shape, and covers the outermost turn of the photo film at one end of the roll, to avoid loosening of the roll in the cassette, in view of reliable transmission of the rotation of the spool.

When the disks are pushed and deformed by edges of the photo film, the photo film is released from being covered by the disks. In view of easiness in the deformation, the disks are thinly formed from resilient resin or the like. There are known methods of producing disks U.S. Pat. No. 5,211,348 (corresponding to JP-A 4-251841 and 5-119436), which disclose a vacuum forming method in which a web of thermoplastic synthetic resin is unrolled, partially heated and softened, and heated portions are sucked through a mold by a vacuum pump. This document also discloses use of an air-pressure forming or thermal molding press to form an uneven shape with recesses or protrusions. JP-A 6-67360 and 6-242552 disclose a process in which a vacuum forming method forms a plurality of recessed and protruded shapes for disks on a web of thermoplastic synthetic resin one at a time, and disks are punched out of the web at each of the disk-like portions.

Thermoplastic synthetic resin, to be used for the material of the disks, requires resistance to high temperature as high as 80° C., resistance to fatigue from deformation and to fatigue from flexure when formed thinly, and low surface abrasion. Examples of the resin meeting those requirements are modified polyphenylene ether (PPE) resin film, polycarbonate film, polyolefin film and the like. The thermoplastic synthetic resin of those kinds is relatively expensive. To raise a proportion of the product number to an amount of the material, disk-like portions are formed in an extremely wide web with an arrangement of small intervals between them.

To heat thermoplastic synthetic resin as such, operation of the heating must be effected in consideration of the high softening point. Examples of heating methods include a heating plate method, a radiation heating method, and a stoving method. In the heating plate method, the web is contacted on a heating plate or hot plate. In the radiation heating method, the web is moved past a heater or an infrared light source and heated by radiation heat therefrom. In the stoving method, the web is moved past a heated space.

The radiation heating method and the stoving method have shortcomings of considerable irregularity in temperature, because those methods fail to heat a large area at a regular temperature. There occur web portions remaining unsucked in the vacuum forming. Disks with low quality will be produced from the unsucked portions as a result of using those methods.

The heating plate method is capable of heating the web with the highest uniformity among all of the above-mentioned heating methods. A problem remains: when the web is contacted on the heating plate in partial fashion, accidentally without regularity, only a contacted portion is extended. If a mold for the vacuum/air-pressure forming is used for pressing the web against the heating plate, the partially heated extended portion can not resist remaining in a wrinkled form. On the other hand, if only a small portion of the web is away from the heating plate during contact of almost the whole of the web on the heating plate, the small portion is not softened and not sucked in the vacuum forming. The unsucked small portion inevitably results in an unacceptable disk.

SUMMARY OF THE INVENTION

In view of the foregoing problems, an object of the present invention is to provide a disk producing method for a photo film cassette with high precision in size.

In order to achieve the above and other objects and advantages of this invention, a heating plate and a mold, disposed to confront with each other, are used. A web of thermoplastic synthetic resin is conveyed from a roll of the web, between the heating plate and the mold, and in intermittent fashion. The web is squeezed between the heating plate and the mold relatively moved to one another while the web is stopped. While the web is squeezed, air suction of the web is effected through the heating plate, and also air pressurization of the web is effected through the mold, so as to soften the web in contact with the heating plate. Air suction of the web is effected through the mold, and also air pressurization of the web is effected through the heating plate, so as to form plural disk-like portions on the web being softened according to vacuum/air-pressure forming in contact with the mold. A portion of the web, squeezed between the heating plate and the mold, is cut into a sheet. Each contour of the disk-like portions and the axial hole in each of the disk-like portions is cut to obtain the disk.

In a preferred embodiment, the mold has plural disk producing cavities arranged in a matrix, and adapted respectively to forming the disk-like portions.

Plural air passageways are formed through the heating plate and adapted to the air suction and the air pressurization of the web, the air passageways respectively have a diameter of 0.3–0.6 mm, and are disposed to confront with positions outside the disk producing cavities in the mold.

A peripheral ridge is formed on a periphery of the mold to project toward the heating plate, for squeezing the web in cooperation with the heating plate, to limit a region of the web subjected to the vacuum/air-pressure forming, and the sheet is cut away from a portion directly contacted on the peripheral ridge.

At least one conveyor chain is adapted to intermittent conveyance of the web. The conveyor chain includes plural pointed portions arranged in a rotational direction thereof and along an edge thereof, for piercing the web, to support the web while preventing the web from being slipped.

In the disk producing method of the present invention, the disk can be produced with high precision in size.

BRIEF DESCRIPTION OF THE DRAWINGS

The above objects and advantages of the present invention will become more apparent from the following detailed description when read in connection with the accompanying drawings, in which:

FIG. 3A is a cross section illustrating one of two disks in the photo film cassette;

FIG. 3B is a cross section illustrating another of the two disks;

DETAILED DESCRIPTION OF THE PREFERRED EMBODIMENT(S) OF THE PRESENT INVENTION

Figure 1:
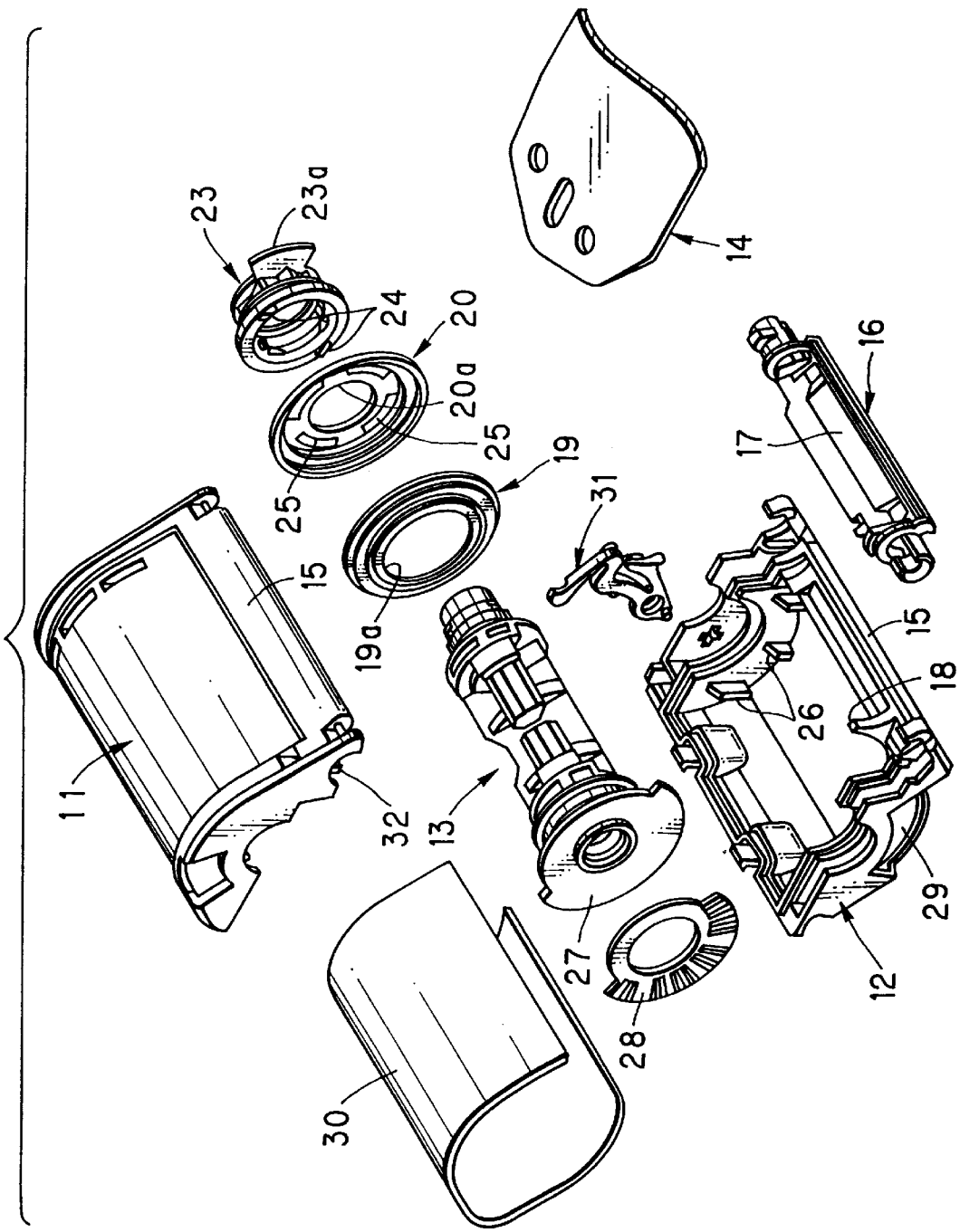
FIG. 1 is an exploded perspective illustrating a photo film cassette.

In FIG. 1, a cassette shell 10 includes upper and lower shell halves 11 and 12 respectively formed from plastic. A spool core 13 is contained in the cassette shell 10 in rotatable fashion, and has photo film 14 wound in a roll form.

The shell halves 11 and 12 respectively have a semicylindrical shape. There is a photo film port 15 defined between tongues extended from the shell halves 11 and 12. When the shell halves 11 and 12 are fitted together, a photo film port shutter 16 is rotatably contained in the photo film port 15. A photo film passageway 17 is formed as a gap in the photo film port shutter 16. When the photo film port shutter 16 rotates to an open position, the photo film passageway 17 communicates from the inside of the photo film port 15 to the outside, to allow the photo film 14 to pass. When the photo film port shutter 16 rotates to a closed position, the photo film port 15 is completely closed, to shield the inside of the cassette shell 10 from ambient light.

A separator claw 18 is formed in the position inward from the photo film port 15 of the lower shell half 12. The separator claw 18, when the spool core 13 is rotated, abuts on a leader of the photo film 14, separates the leader from the roll, and guides it to the photo film passageway 17.

Disks 19 and 20 have respective axial holes 19a and 20a. The spool core 13 is inserted through the axial holes 19a and 20a to secure the disks 19 and 20 to on the spool core 13 in rotatable fashion in their positions. There are formed ring-like lips 21 on the periphery of 19 and 20 to project toward each other. The ring-like lips 21 partially cover edges of the outermost turn of the photo film 14.

When a barrel member 23 is fitted on the spool core 13, retaining holes 25 in the disk 20 are retainable on the clutch claws 24. In rotation of the spool core 13 in the unwinding direction, the retaining holes 25 are retained by the clutch claws 24 to transmit rotation to the disk 20. When the spool core 13 is rotated in the winding direction, the retaining holes 25 are not retained by the clutch claws 24, so that the disk 20 is rotationally free from the spool core 13. On the other hand, the disk 19 is always rotatable about the spool core 13. There is a sector plate 23a formed with the barrel member 23. A position of the sector plate 23a is visible through one of indicator windows. A usage status of the photo film cassette is indicated through the one window.

Ridges 26 are projected from an inside of the shell halves 11 and 12, and prevent the disks 19 and 20 from spreading. A sector plate 27 is fixed on the spool core 13, and has a data bar code sticker 28 attached thereto. There is a bar code printed on the data bar code sticker 28 and arranged radially. The bar code is photoelectrically detected through a window 29 in the cassette shell 10 when the spool core 13 is rotated. It is possible to read information of the type of photo film 14 contained in the cassette shell 10 and information of the number of frames of the photo film 14. A sticker 30 attached to the cassette shell 10 has indication of the photo film type information and an identifying information of the cassette.

A spool lock 31 blocks rotation of the spool core 13 while the photo film port shutter 16 has the closed position. When the photo film port shutter 16 is rotated to the open position, the spool core 13 is unblocked. Reference numeral 32 designates a lock pawl formed integrally with the upper shell half 11. The photo film port shutter 16 is locked by the lock pawl 32 when rotated to the closed position. A camera or a display device adapted with the photo film cassette includes an opener mechanism, which unlocks the lock pawl 32 to open the photo film port shutter 16 when the camera or display device is loaded with the photo film cassette. Note that it is possible to form a photo film passageway in the photo film port 15, and to attach plush or light-trap fabric instead of the use of the photo film port shutter 16, for the purpose of shielding ambient light from the cassette shell 10.

Figure 2:
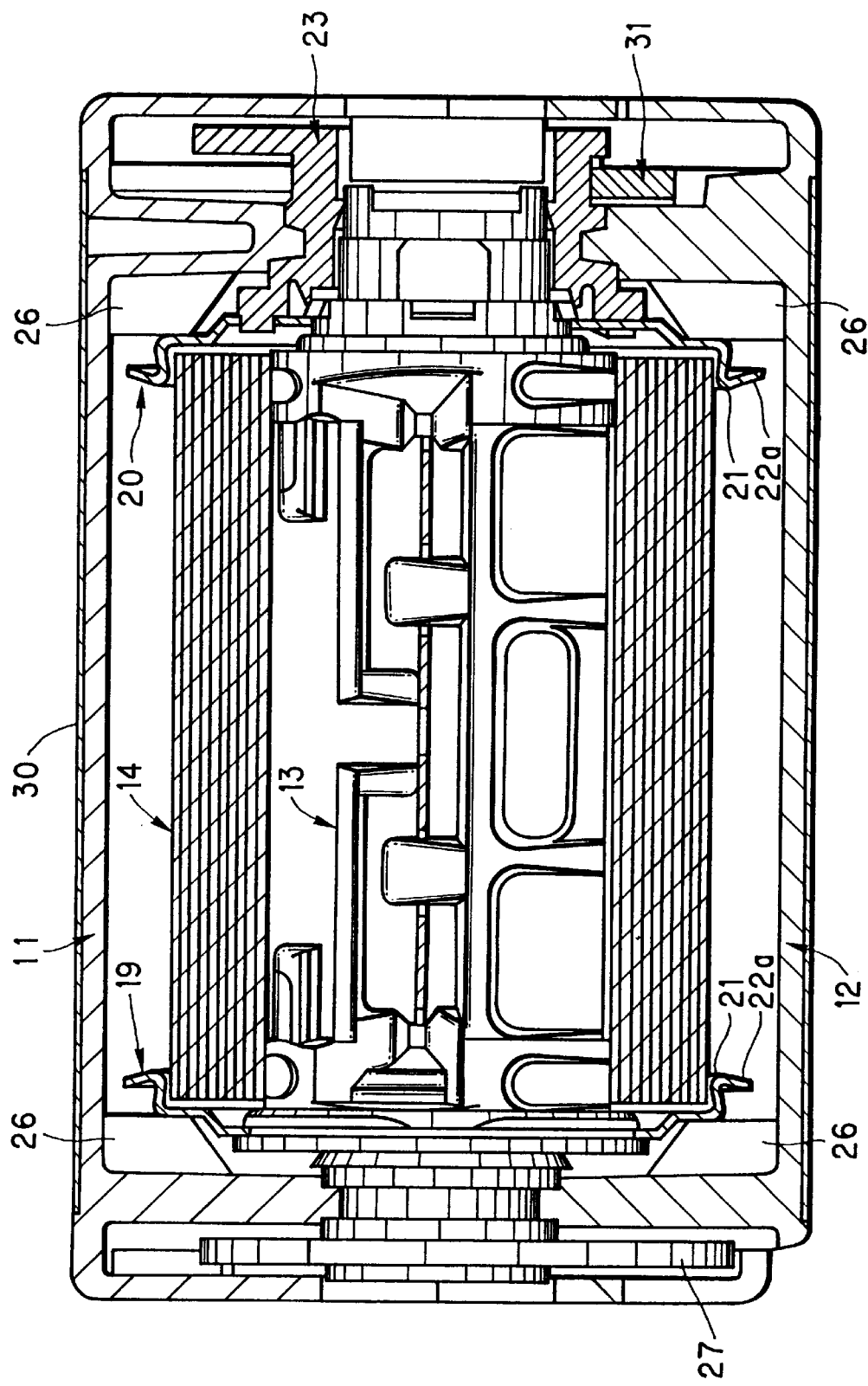
FIG. 2 is a horizontal section illustrating the photo film cassette.

As illustrated in FIG. 2, when the photo film 14 is completely contained in the cassette shell 10, the outermost turn of the photo film 14 is partially covered in the ring-like lips 21 of the disks 19 and 20, and prevented from being loosened about the spool core 13. When the spool core 13 is rotated in the unwinding direction of the photo film 14, the photo film 14 rotates integrally with the spool core 13.

The ridges 26 inside the shell halves 11 and 12 regulate movable ranges of the disks 19 and 20. In the position inward from the photo film port 15, an interval between confronted two of the ridges 26 is enlarged, locally to release the disks 19 and 20 for being spread. After the leader of the photo film 14 is separated by the separator claw 18 toward the photo film passageway 17, the disks 19 and 20 are spread outwards. The photo film 14 is advanced from between the ring-like lips 21 in curled fashion like an archway.

Note that it is possible to eliminate a half of the ridges 26 on one end face of the cassette, while using the remaining half of the ridges 26. There are other alternative structures to releasing prevention of looseness of the photo film: a pair of separator claws are formed on both sides with reference to the width direction of the photo film. Lateral faces of the separator claws can keep the lips partially deformed in a direction away from one another.

When a camera is loaded with the photo film cassette, the camera releases the photo film port shutter 16 from the retention of the lock pawl 32, and rotates the photo film port shutter 16 to the open position. Then the spool core 13 is rotated in the unwinding direction, to start advancing the photo film 14. As the ring-like lips 21 of the disks 19 and 20 are avoiding loosening the photo film 14, the roll of the photo film 14 rotates integrally with the spool core 13. The leader of the photo film 14 is separated by the separator claw 18, and directed to the photo film passageway 17.

While the leader of the photo film 14 is passed through the photo film passageway 17, the photo film 14 spreads the ring-like lips 21 outwards, so that the photo film 14 is released from being covered in the ring-like lips 21 in the position inward from the photo film passageway 17. The disk 20 is forcibly rotated in the unwinding direction in engagement of the clutch claws 24 with the retaining holes 25, and thus raises force to advance the photo film 14. This being so, rotation of the spool core 13 causes the photo film 14 to advance to the outside of the cassette shell 10.

In the photo film rewinding, the spool core 13 is rotated in reverse. As the trailer of the photo film 14 is retained on the spool core 13, the photo film 14 is wound back into the cassette shell 10 by the rotation of the spool core 13. In a position inward from the photo film passageway 17, the disks 19 and 20 are spread, between which the photo film 14 is taken up and wound about the spool core 13.

The disk 19 in FIG. 3A has a contour the same as the disk 20 in FIG. 3B. The axial holes 19a and 20a are formed respectively in a central wall 39, which is stepped from an intermediate wall 38. The intermediate wall 38 is contacted on each end face of the roll of the photo film 14, unlike the central wall 39 which is away from the photo film 14. Each of the ring-like lips 21 is projected from the periphery of the intermediate wall 38, to cover the outermost turn of the photo film 14 partially about the spool core 13.

The periphery of each of the ring-like lips 21 has a ring-like projection 22, which reinforces the ring-like lips 21 and is resistant to spreading of the ring-like lips 21. Also the ring-like projection 22 has a face 22a inclined in a direction away from the opposite disk. In winding the photo film 14, the inclined face 22a guides the photo film 14 toward a cylindrical space defined inside the ring-like lips 21.

Figure 4A:
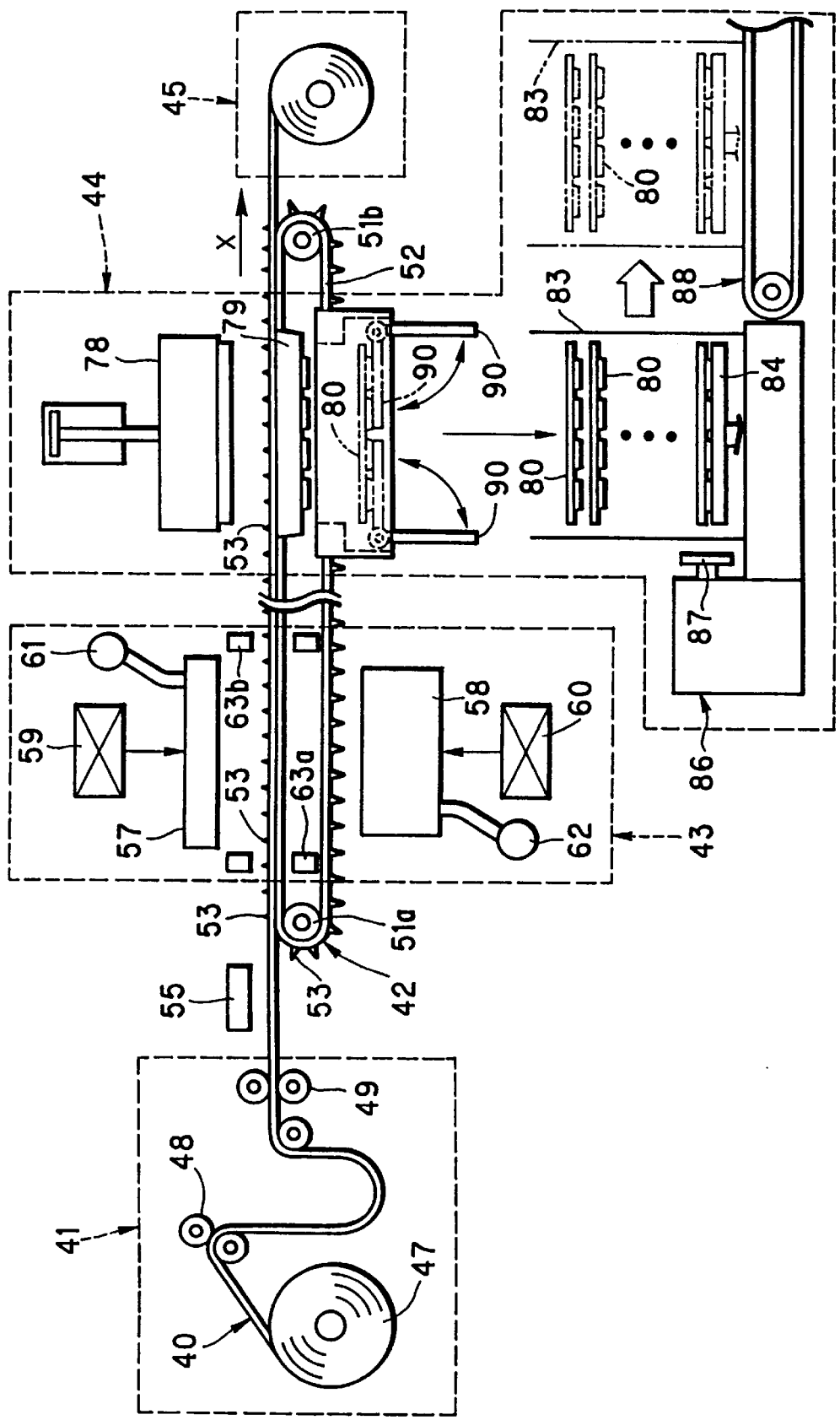
FIG. 4A is an explanatory view illustrating a disk producing apparatus.

FIG. 4A illustrates an apparatus for producing the disks 19 and 20. The apparatus works web 40 of thermoplastic synthetic resin as material of the disks 19 and 20, and includes a web supplier 41, a web conveyor 42, a heating/forming unit 43, a web/sheet cutter device 44 and a web winder 45.

The web 40 is formed of resin of polystyrene-modified polyphenylene ether with elastomer added thereto. The ratio of polystyrene and polyphenylene ether is 3:7. The proportion of elastomer is 12 wt. %. Silicone and/or antistatic agent is added to the resin when desired. It is also possible that the web 40 is polycarbonate film, polyethylene film or the like. The web 40 has a thickness of 0.15 mm ±30%, preferably 0.15 mm ±20%, and desirably 0.15 mm ±10%. The web 40 has a width of 200–300 mm.

The web supplier 41 includes a web roll 47, a loop control device 48 and conveyor rollers 49. The web 40 is drawn from the web roll 47 by the loop control device 48 by as much as a predetermined length. The conveyor rollers 49 feeds the web conveyor 42 with the web 40. A spare web roll (not shown) is contained in the web supplier 41. As soon as the web 40 from the web roll 47 is used up, the spare web roll is loaded, to supply the web 40 without interruption.

Figure 5:
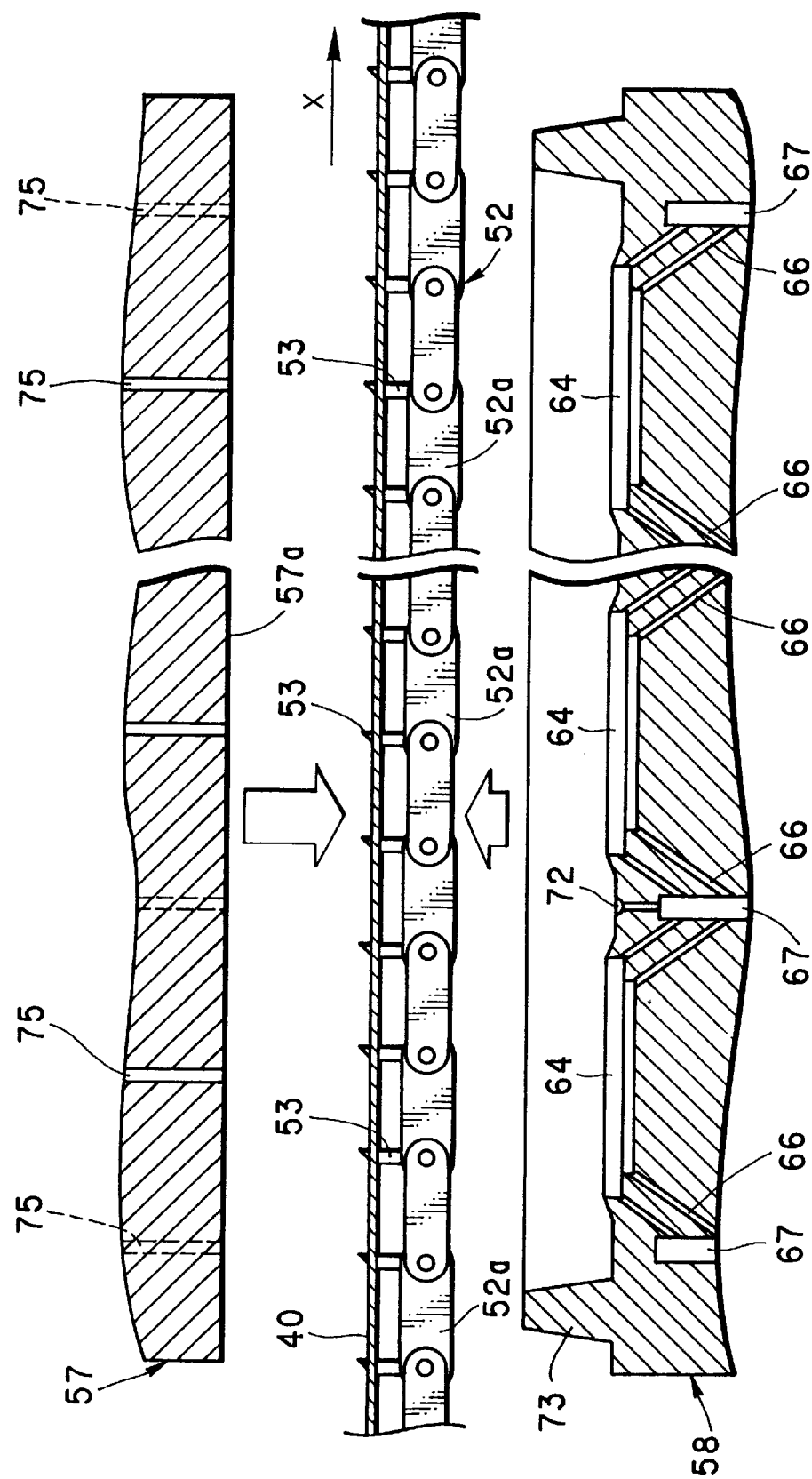
FIG. 5 is a vertical section illustrating the heating/forming unit standing by for operation.

The web conveyor 42 includes two chains 52 and a number of pointed portions 53. Each of the chains 52 is supported rotatably about a driving sprocket wheel 51a and a driven sprocket wheel 51b. As illustrated in FIG. 5, each of the pointed portions 53 is formed to project from one of links 52a connected to constitute the chains 52. The pointed portions 53 have a tip sharp enough for penetration. When the web 40 is supplied from the web supplier 41, the pointed portions 53 serially penetrate an edge portion of the web 40. Movement of the chains 52 conveys the web 40 in the arrow direction X in intermittent fashion at a regular length. The chains 52 are respectively disposed under edges of the web 40, to support and convey the web 40. The chains 52 are constructed in accordance with JP-U 61-176136, in which the web having the small thickness can be reliably pierced by the pointed portions 53 of the chains 52, no chip is created from the web in piercing the web, and also the web can be kept flat without undulation when pierced.

For the pointed portions 53 smoothly to pierce the web 40, a heater 55 is disposed upstream from the web conveyor 42 for heating edges of the web 40. The heater 55 heats edge portions of the web 40 in a range of 3–15 mm from each side of the web 40, as the edge portions are not subjected to the forming in the heating/forming unit 43. The web 40 is softened by the heater 55 at the temperature of 50–120° C., preferably 70–110° C., and desirably 80–100° C. If the web 40 has a great thermal expansibility, it is preferable to preheat the web 40 before the heating/forming unit 43, and expand the web 40 before the vacuum/air-pressure forming, so as to prevent occurrence of wrinkles on the web 40.

Figure 4B:
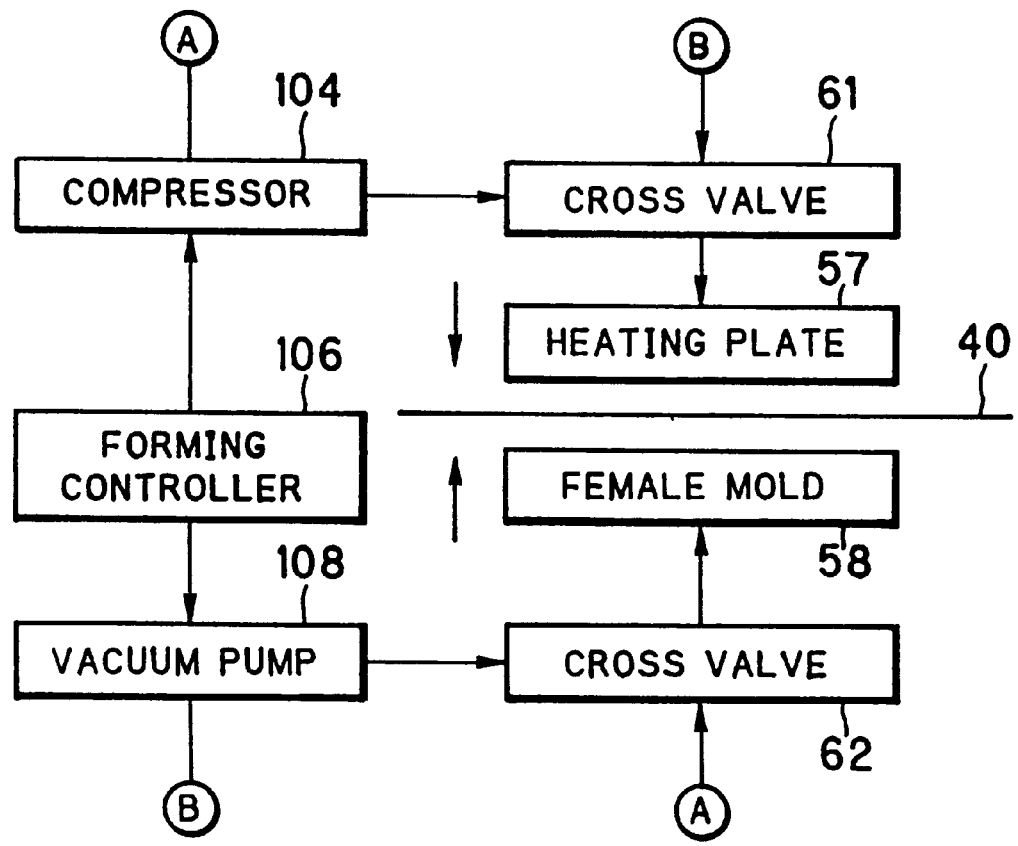
FIG. 4B is an explanatory view illustrating a compressor and a vacuum pump with a heating/forming unit.

The web 40 supported on the web conveyor 42 is conveyed along the chains 52 to the heating/forming unit 43. The heating/forming unit 43 includes a hot plate or heating plate 57 over the web 40 and a female mold 58 under the web 40. A shifter mechanism 59 is associated with the heating plate 57. There are a vacuum pump 108 and a compressor 104 associated with the heating plate 57 via a cross valve 61 (see FIG. 4B). The shifter mechanism 59 shifts the heating plate 57 up and down. The vacuum pump 108 as air sucker effects air suction of the web 40 through the heating plate 57. The compressor 104 as air pressurizer effects air pressurization to the web 40 through the heating plate 57. There is a shifter mechanism 60 associated with the female mold 58. The vacuum pump 108 and the compressor 104 are also associated with the female mold 58 via a cross valve 62. The shifter mechanism 60 is similar to the shifter mechanism 59. With the heating plate 57 disposed above the web 40 and the female mold 58 under the web 40, it is possible to renew or maintain the female mold 58 with great ease.

The heating plate 57 is lowered toward the web 40 at the same time as the female mold 58 is raised toward the web 40. For both of the heating plate 57 and the female mold 58, the web 40 is referred to as a reference plane. The web 40 is squeezed between them before the heating and the vacuum/air-pressure forming. The shifter mechanisms 59 and 60 respectively include a servo motor to cause the heating plate 57 and the female mold 58 to move with precision. It is also possible instead to use an air cylinder, a hydraulic cylinder, a solenoid, a cam or the like while taking it in consideration to keeping precision in movement.

There are clampers/coolers 63a and 63b disposed upstream and downstream from the heating plate 57, and the female mold 58. The clampers/coolers 63*a* and 63*b* squeeze the web 40 in fixed fashion, and avoid occurrence of wrinkles on the web 40 pulled into the position between the heating plate 57 and the female mold 58. The clampers/coolers 63*a* and 63*b* respectively include passageways through which cooling water flows, and cool down squeezed portions of the web 40. This is effective in preventing heat of the heating plate 57 from application to the unheated portions of the web 40. The double application of heat to the web 40 is avoided.

As illustrated in FIG. 5, the female mold 58 includes a plurality of disk producing cavities 64 respectively for shaping the contour of the disks 19 and 20. There are air passageways 66 communicating respectively with edges of the disk producing cavities 64 for the purpose of the air suction and the air pressurization. The air passageways 66 are connected to air passageways 67 formed vertically in the female mold 58. The air passageways 67 are connected to the cross valve 62 as described above.

Figure 6:
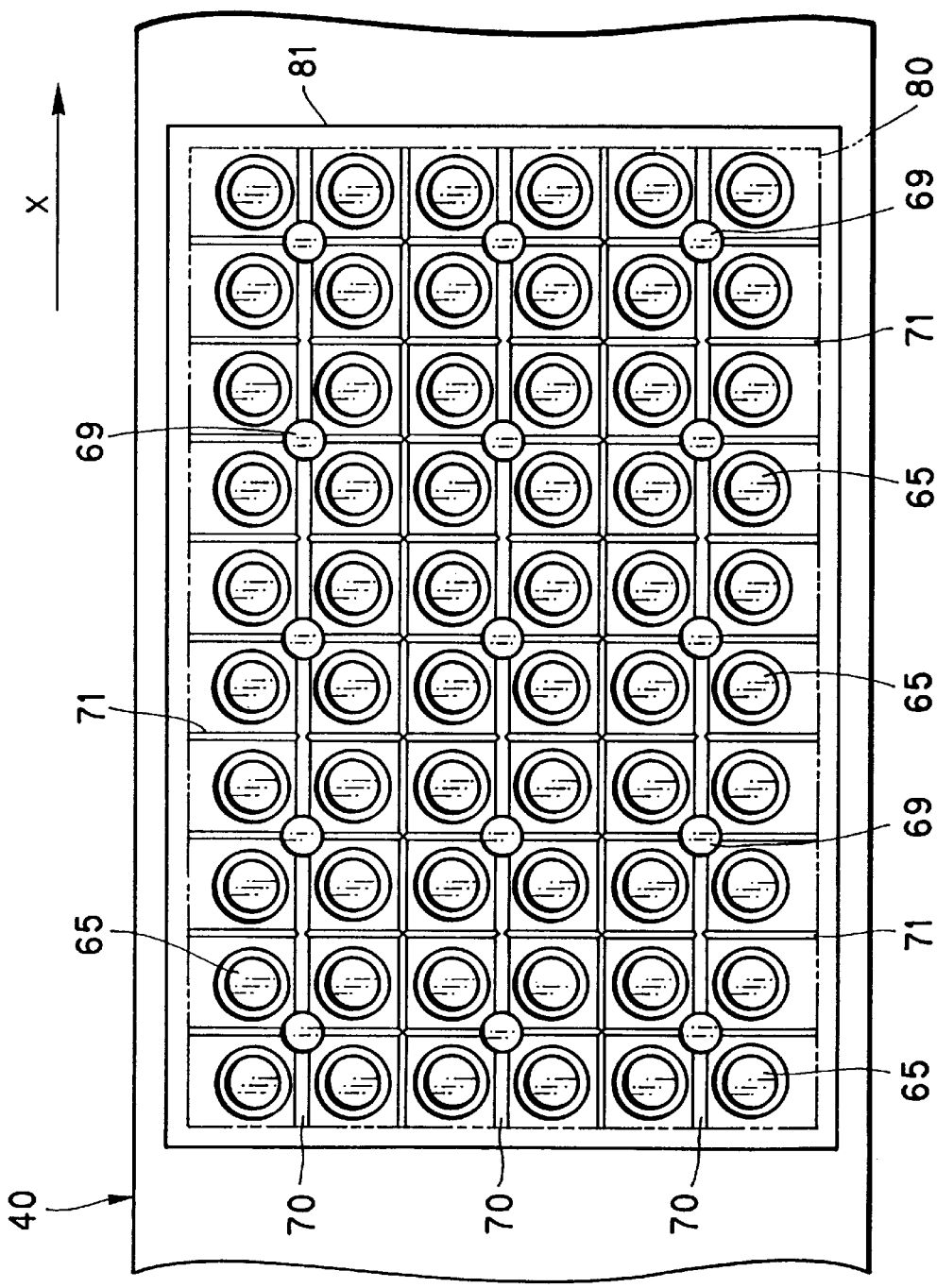
FIG. 6 is a plan illustrating web after operation of the vacuum/air-pressure forming.

The number of the disk producing cavities 64 in the female mold 58 is 60, as the disk producing cavities 64 are arranged in a matrix of 6×10, and include 10 as viewed in the arrow direction X and six (6) as viewed transverse to the arrow direction X. This corresponds to the shape of the web 40 after the forming as illustrated in FIG. 6. When one shot of operation of the forming is effected, 60 disk-like portions 65 are formed on the web 40.

The female mold 58 has the disk producing cavities 64, and also includes positioner producing cavities (not shown), guide producing cavities (not shown) and ridge producing cavities 72. The positioner producing cavities are adapted respectively to forming circular positioning portions 69, which are positioned when the disk-like portions 65 are punched. The guide producing cavities are adapted respectively to forming guide ridges 70, which guide movement of the web 40 before punching the disk-like portions 65. The ridge producing cavities 72 are adapted respectively to forming reinforcer ridges 71 for reinforcement of the web 40.

Figure 7A:
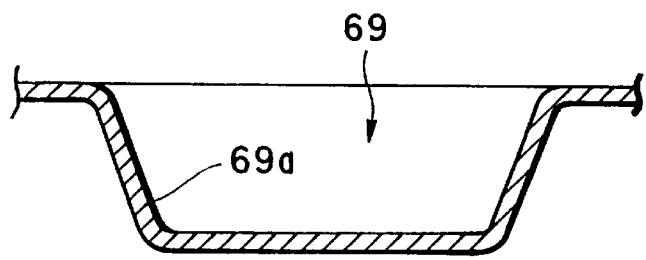
FIG. 7A is a cross section illustrating one of circular positioning portions.

The positioning portions 69 have a cup shape as viewed in cross section of FIG. 7A, and has an inclined face 69*a*. To punch the disk-like portions 65, positioning pins are respectively inserted into the positioning portions 69. The positioning pins have inclination, and are fitted on the inclined face 69*a* for reliable positioning of the web 40. The positioning portions 69 are arranged every two rows and every two columns of the disk-like portions 65. In other words, the positioning portions 69 are arranged in a matrix of 3×5, and are 15 formed at one time.

Figure 7B:
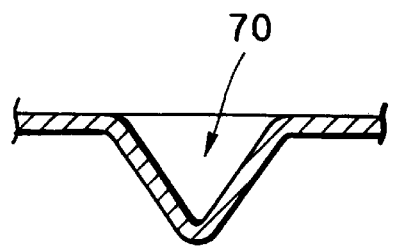
FIG. 7B is a cross section illustrating one of guide ridges.
Figure 7C:
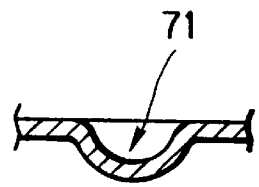
FIG. 7C is a cross section illustrating one of reinforcer ridges.

The guide ridges 70 have a V-shape as viewed in cross section of FIG. 7B, and guides the sheet from the web 40 when fitted in a groove which is formed in a punch for punching away the disk-like portions 65 from the sheet from the web 40. The three (3) guide ridges 70 are arranged in the arrow direction X and aligned with the positioning portions 69. The reinforcer ridges 71 have an arc shape as viewed in cross section of FIG. 7C, and reinforce the sheet cut from the web 40 after the one-shot forming. The reinforcer ridges 71 are disposed between the disk-like portions 65 in grating fashion.

The periphery of the female mold 58 has a peripheral ridge 73 projected upwards and about the disk producing cavities 64. The peripheral ridge 73 is used to squeeze the web 40 between it and the heating plate 57. The contact of the web 40 with the heating plate 57 is rendered reliable by the use of the peripheral ridge 73, as occurrence of wrinkles on the web 40 is reduced without excessively regulating the web 40.

The heating plate 57 is formed of material having high thermal conductivity, such as iron, aluminum and the like, and incorporates a plurality of cartridge heaters for heating a surface 57*a* of the heating plate 57 in uniform fashion. The surface 57*a* of the heating plate 57 is heated to the temperature of approximately 200° C., is contacted on the web 40, and heats and softens it with suitability for the vacuum/air-pressure forming. To control the temperature, it is preferable to use the control method disclosed in JP-A 4-176632 for heating the surface 57*a* in stable and uniform fashion.

The heating plate 57 is as large as or larger than the periphery of the peripheral ridge 73 of the female mold 58. Let L be a length at which the periphery of the heating plate 57 extends beyond the periphery of the peripheral ridge 73. L has a range, for example, from 0 mm to 10 mm. If the heating plate 57 should be too small, it would be impossible to squeeze the web 40 properly with the peripheral ridge 73. If the heating plate 57 should be too large as compared with the female mold 58, the heating plate 57 would heat too large an area in the web 40, to cause double heating of portions of the web 40 in degradation. No proper disks 19 and 20 would be acquired.

Figure 8:
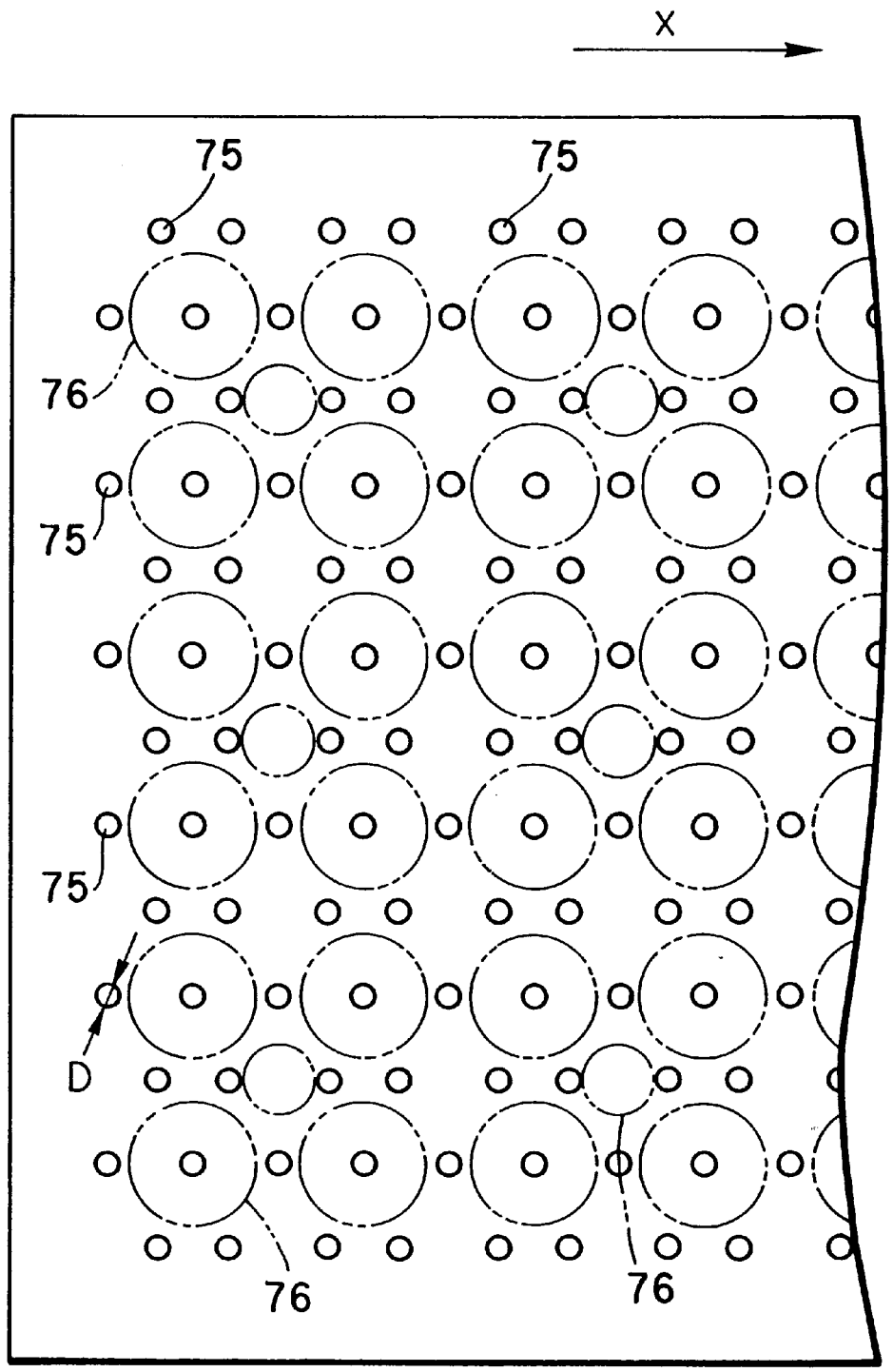
FIG. 8 is a plan illustrating arrangement of air passageways relative to disk producing cavities in the female mold.

The heating plate 57 has plural air passageways 75 adapted to air suction of the web 40 for keeping the web 40 in contact with the heating plate 57 in uniform fashion, and adapted to air pressurization of the web 40 for effecting the air-pressure forming of the web 40. The air passageways 75 are connected to the cross valve 61. As viewed in the plane of FIG. 8, open ends of the air passageways 75 have a circular shape, and are away from positions 76 indicated by the phantom lines along which the disk producing cavities 64 and the positioner producing cavities of the female mold 58 are arranged, namely in association with the disk-like portions 65 and the positioning portions 69. Some of the air passageways 75 are located in the center of the positions 76, but are positioned in association with the axial holes 19*a* and 20*a*, and do not influence quality of the disks 19 and 20.

Should the diameter D of the air passageways 75 be too great, suction of the web 40 through the air passageways 75 would tear the web 40. Should the diameter D of the air passageways 75 be too small, the air passageways 75 would fail to suck the web 40 and fail to heat the web 40. Experiments were conducted by changing the diameter D of the air passageways 75, to observe suckability and breakage of the web 40. In Table 1, the suckability was expressed by a degree of contact of the web 40 with the heating plate 57. "A" represents excellent, "B" good, and "C" fair. In evaluation of the breakage, "A" represents excellent, namely lack of deformation of the web 40. "B" represents good, and "C" fair. "X" represents breakage of the web 40.

TABLE 1

| Diameter D (mm) | 0.3 | 0.35 | 0.4 | 0.5 | 0.55 | 0.6 | 0.7 |
|---|---|---|---|---|---|---|---|
| Suckability | C | B | A | A | A | A | A |
| Breakage | A | A | A | A | B | C | X |

As a result, when the diameter D of the air passageways 75 was 0.4 mm or 0.5 mm, it was possible to suck the web 40 on the heating plate 57 the most properly. When the diameter D was 0.3 mm, the suckability was evaluated as C, but higher than failure. When the diameter D was 0.6 mm, again the suckability was evaluated as C, but allowable in view of the positions of the air passageways 75 away from the positions 76. It is concluded that a preferable range of the diameter D is 0.3–0.6 mm. The diameter D has a more preferable range of 0.35–0.55 mm, and a desirable range of 0.4–0.5 mm.

It is likely that air gaps occur between the heating plate 57 and the web 40 in the course of suction on the heating plate 57. The air gaps cause the web 40 to extend, so that the disk-like portions 65 are likely to be degraded. To prevent such air gaps, the surface 57a of the heating plate 57 has a surface roughness of 0.5–20 μm. It is possible that minute gaps between the surface 57a and the web 40 absorb air between them, so that the web 40 can be heated with reliability. Should the surface 57a be too rough, the disks 19 and 20 would have too rough a surfaces which would cause failure in rotation. It follows that the preferable surface roughness of the surface 57a is 20 μm or less.

Figure 9:
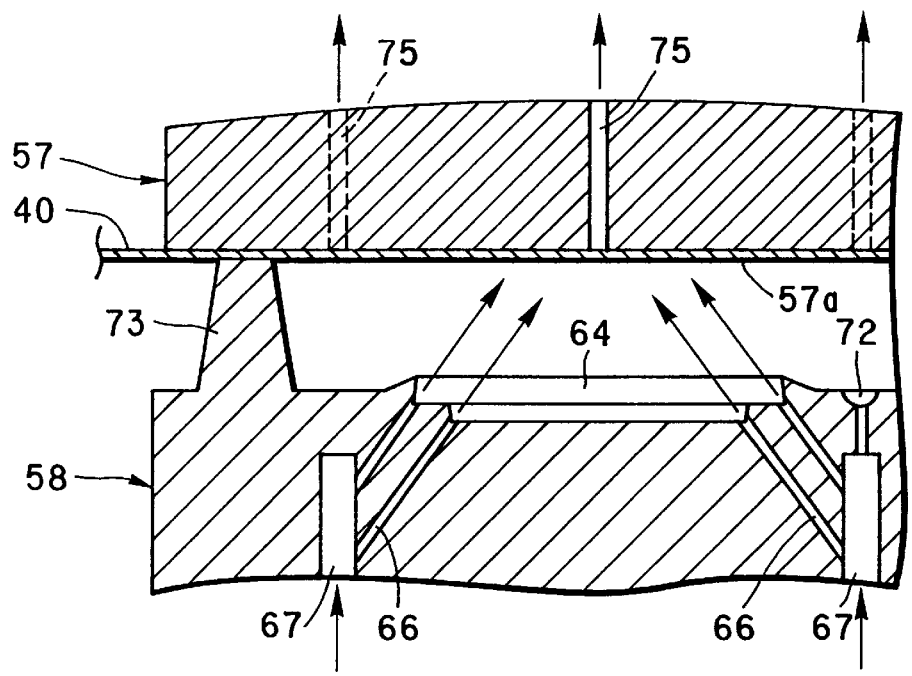
FIG. 9 is a vertical section illustrating the heating/forming unit heating the web.

In the heating/forming unit 43, when the web 40 in conveyance is stopped, the clampers/coolers 63a and 63b squeeze the front and the rear of the web 40, toward which the heating plate 57 and the female mold 58 are moved by the shifter mechanisms 59 and 60. As illustrated in FIG. 9, the web 40 is squeezed between the surface 57a of the heating plate 57 and the peripheral ridge 73 of the female mold 58. In the heating plate 57, the cross valve 61 and vacuum pump 108 are driven to effect the air suction of the web 40 through the air passageways 75. In the female mold 58, the cross valve 62 and the compressor 104 are driven to effect the air pressurization of the web 40 toward the heating plate 57 through the air passageways 67 and 66. The web 40 is fully contacted on the heating plate 57, and heated in uniform fashion.

Figure 10:
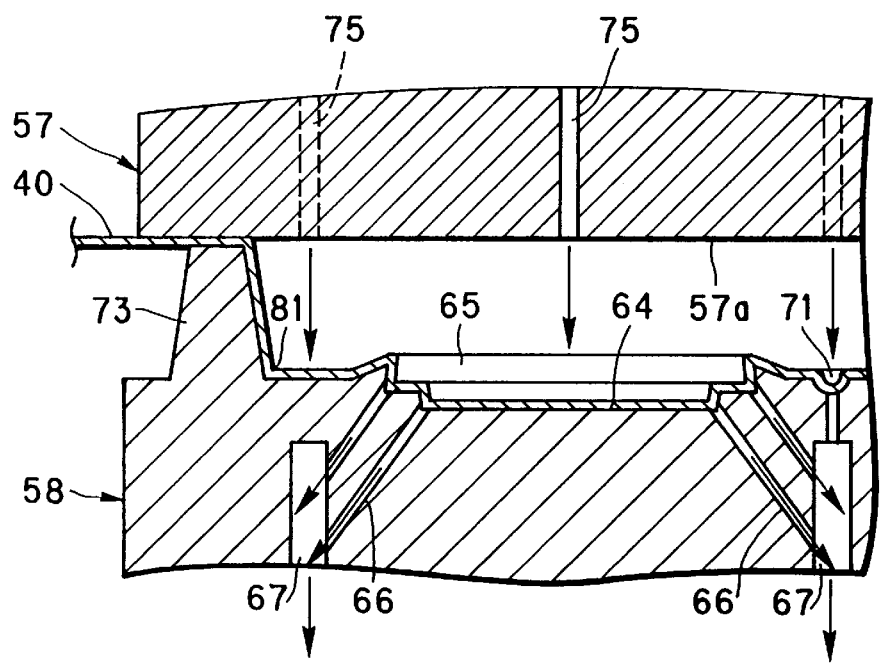
FIG. 10 is a vertical section illustrating the heating/forming unit operating for the vacuum/air-pressure forming.

After heating the web 40, the cross valve 62 at the female mold 58 is changed over to the air suction. The cross valve 61 at the heating plate 57 is changed over to the air pressurization. In FIG. 10, the web 40 is tightly fitted on the inside of the peripheral ridge 73 of the female mold 58, and on the inside of the disk producing cavities 64, the ridge producing cavities 72, the positioner producing cavities and the guide producing cavities. One-shot operation of the vacuum/air-pressure forming forms the disk-like portions 65, the positioning portions 69, the guide ridges 70 and the reinforcer ridges 71 as illustrated in FIG. 6.

As illustrated in FIG. 4A, the web/sheet cutter device 44 includes an upper punch 78 above the web 40 and a lower die 79 under the web 40. The upper punch 78 is lowered toward the web 40 stopped in conveyance on the web conveyor 42. The upper punch 78 and the lower die 79 squeeze the web 40. Lines of cutting of the upper punch 78 and the lower die 79 are indicated by the phantom lines in FIG. 6 and located inside the peripheral ridge 73. The web 40 is cut into a sheet 80 having a plurality of disk-like portions 65. The web 40 after cutting the sheet 80 is wound by the web winder 45, and reused later.

The position of the phantom line along which the sheet 80 is cut away from the web 40 is inside a line 81 located the innermost on the peripheral ridge 73 of the female mold 58. Impression of the peripheral ridge 73 on the web 40 and/or wrinkles created by the heating plate 57 or the female mold 58 are eliminated by cutting the sheet 80, which can be readily overlaid on another and stacked together.

The sheet 80 cut from the web 40 is separated from the web 40 by a knockout device incorporated in the upper punch 78, and dropped down through the lower die 79. A sheet stacking container 83 is disposed under the lower die 79 for stacking a plurality of sheets 80 overlaid on one another. In the sheet stacking container 83 is disposed a movable bottom plate 84 movable up and down. Note that it is possible to eliminate the sheet stacking container 83, and to use the movable plate 84 simply for stacking the sheet 80.

The movable plate 84, when receiving the sheet 80 at first, is located in its uppermost position inside the sheet stacking container 83, to minimize the distance to the lower die 79. This prevents the sheet 80 from changing its orientation while being dropped from the lower die 79. In the sheet stacking container 83, is disposed a sensor for monitoring the stacked height of the sheets 80. An output of the sensor is evaluated, to control the movable plate 84 to move down in the sheet stacking container 83 gradually according thereto. The distance between the lower die 79 and the sheet 80 is kept unchanged.

The sheet stacking container 83 is placed on a container shifter 86. When the sheet stacking container 83 comes to contain a predetermined number of sheets 80, the container shifter 86 thrusts a slider 87 rightwards in the drawing, to shift the sheet stacking container 83 to an upside of a sheet conveyor 88. The sheet conveyor 88 includes a conveyor belt, and conveys the sheet stacking container 83 to a station where the disks 19 and 20 are punched from the sheet 80.

Under the lower die 79 is disposed a shutter device for provisionally retaining the sheet 80 while the container shifter 86 transfers the sheet stacking container 83 toward the sheet conveyor 88. The shutter device is constituted of a pair of shutter plates 90 swung to open/close the bottom of the cavity in the lower die 79. When the sheet stacking container 83 is moved away from the container shifter 86 to wait for another container to be placed on the container shifter 86, the sheet 80 is retained by the shutter plates 90 provisionally as indicated by the phantom line. When the next container is placed on the container shifter 86, the shutter plates 90 are opened to cause the sheet 80 to drop down to the sheet stacking container 83.

Figure 11A:
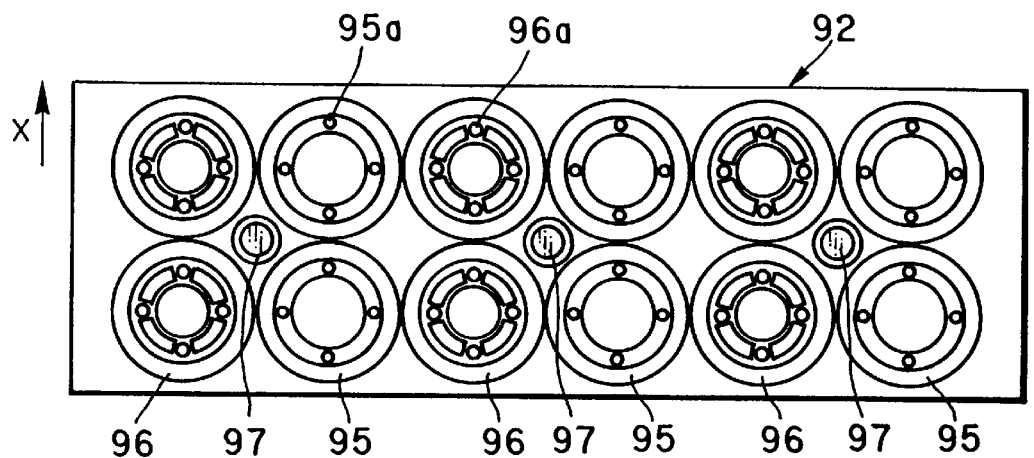
FIG. 11A is a plan view illustrating an upper punch of a punching device.
Figure 11B:
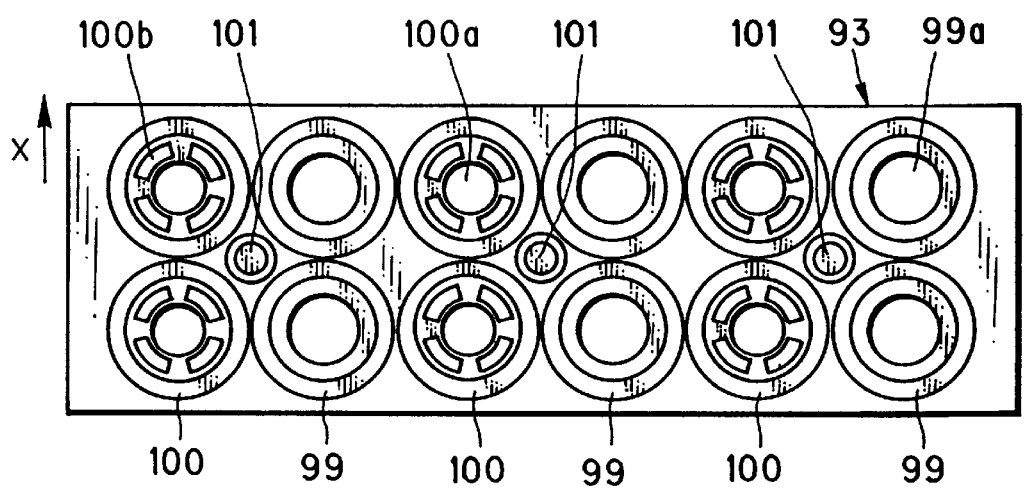
FIG. 11B is a plan view illustrating a lower die of the punching device.

In the disk punching station, the sheets 80 are taken out of the sheet stacking container 83 one after another and supplied into a punching device. The punching device has an upper punch 92 of FIG. 11A and a lower die 93 of FIG. 11B corresponding to the upper punch 92, to cut out the disks 19 and 20.

The upper punch 92 includes six (6) punch blades 95 of a first type, six (6) punch blades 96 of a second type and three (3) positioning pins 97. Each of the punch blades 95 of the first type cuts the shape of the disk 19 from the disk-like portions 65. Each of the punch blades 96 of the second type cuts the shape of the disk 20 from the disk-like portions 65. In the upper punch 92, each of the punch blades 95 and 96 consists of an insert disposed in a common support, for punching of the disk-like portions 65 arranged at a small interval in view of a heightened proportion of the product number to an amount of the material. There are a plurality of sucking holes 95a and 96a in the punch blades 95 and 96. After punching the disks 19 and 20 away from the sheet 80, the punch blades 95 and 96 are adapted to suck and separate the disks 19 and 20 from the sheet 80.

The lower die 93 includes six (6) die blades 99 of a first type, six (6) die blades 100 of a second type and three (3) positioning pins 101. Each of the die blades 99 of the first type cuts the shape of the disk 19 from the disk-like portions 65. Each of the die blades 100 of the second type cuts the shape of the disk 20 from the disk-like portions 65. In the lower die 93, each of the die blades 99 and 100 consists of an insert disposed in a common support. There are a plurality of cavities 99a, 100a and 100b in the die blades 99 and 100. The cavities 99a, 100a and 100b are exits for dust created by cutting the axial holes 19a, 20a and the retaining holes 25. The dust is exited by operation of suction.

The blades 95 and 96 of the upper punch 92 and the blades 99 and 100 of the lower die 93 are arranged in a matrix of 6×2, and include two (2) as viewed in the arrow direction X and six (6) as viewed transverse to the arrow direction X. Three (3) of the positioning portions 69 are kept positioned, while 12 of the disk-like portions 65 are punched, to produce the six (6) disks 19 and the six (6) disks 20. This being so, the disk-like portions 65 can be positioned more easily after the step of cutting the sheet 80 from the web 40 than a conventional step where the disks 19 and 20 are directly punched from the web 40 without utilizing the sheet 80.

Figure 12:
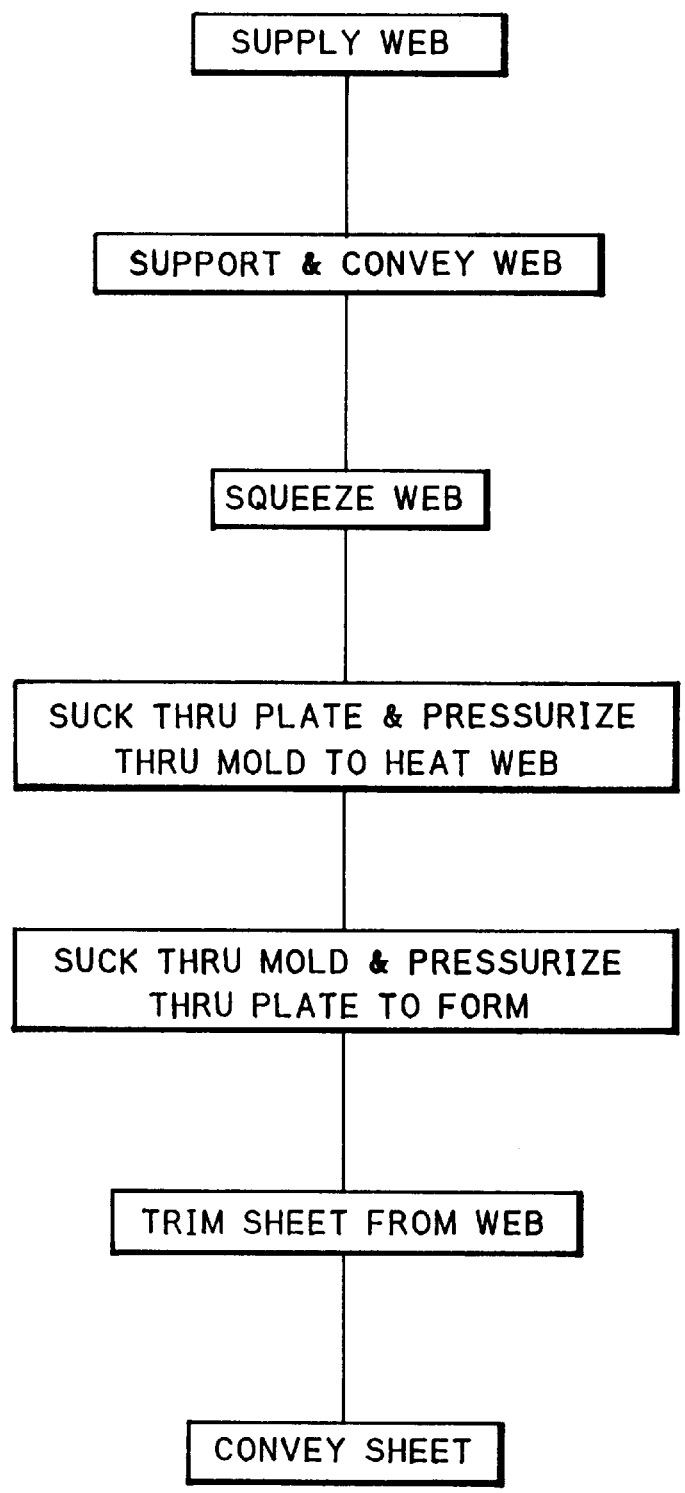
FIG. 12 is a flow chart illustrating a disk producing process of the present invention.

Operation of the above embodiment is described with reference to FIG. 12. When the disk producing apparatus in FIG. 4 is externally operated, the loop control device 48 in the web supplier 41 draws the web 40 from the web roll 47 by as much as a predetermined amount. The conveyor rollers 49 then convey the web 40 toward the web conveyor 42.

The web 40 supplied from the web supplier 41 is heated by the heater 55 in the edge ranges of 3–15 mm from each side of the web 40, and at the temperature of 50–120° C., preferably 70–110° C., and desirably 80–100° C. The edge portions as heated are pierced by the pointed portions 53 serially in FIG. 5. The web 40 is kept raised at a regular height by the chains 52, and conveyed toward the heating/forming unit 43 regularly and with precision by the chains 52 moved by the driving sprocket wheel 51a.

When the chains 52 are stopped, the heating plate 57 and the female mold 58 are moved toward the web 40 by the shifter mechanisms 59 and 60. The web 40, as illustrated in FIG. 9, is squeezed between the surface 57a of the heating plate 57 and the peripheral ridge 73 of the female mold 58. At the same time the clampers/coolers 63a and 63b squeeze the web 40 in the positions upstream and downstream from the heating plate 57 and the female mold 58. The cross valve 61 and the vacuum pump 108 are driven to operate through the heating plate 57, to suck the web 40 at the air passageways 75. Also the cross valve 62 and the compressor 104 are driven to operate through the heating plate 57, to pressurize the web 40 away from the air passageways 67 and 66 toward the heating plate 57. The web 40 is pressed by the peripheral ridge 73 of the female mold 58, and not regulated excessively. The suitable roughness of the surface 57a cause air to discharge from between the heating plate 57 and the web 40. The web 40 is fully contacted on the heating plate 57, and heated and softened in uniform fashion.

When the web 40 finishes being heated, the cross valve 62 on the female mold 58 is changed over to the air suction. The cross valve 61 on the heating plate 57 effects the air pressurization. As illustrated in FIG. 10, the web 40 becomes fitted on the inside of the peripheral ridge 73 of the female mold 58, and further in the disk producing cavities 64, the ridge producing cavities 72, the positioner producing cavities and the guide producing cavities. In FIG. 6, the one-shot vacuum/air-pressure forming is effected to form the disk-like portions 65, the positioning portions 69, the guide ridges 70 and the reinforcer ridges 71 at one time.

After the vacuum/air-pressure forming of the web 40, the heating plate 57 and the female mold 58 are moved away from the web 40 to initial positions, and released from being clamped by the clampers/coolers 63a and 63b. The part of the web 40 provided with the disk-like portions 65 is conveyed to the web/sheet cutter device 44 by the web conveyor 42 and stopped.

In the web/sheet cutter device 44, the upper punch 78 is lowered toward the web 40, and squeezes the web 40 between it and the lower die 79, so that the web 40 is trimmed into the sheet 80 along the phantom lines of FIG. 6.

The sheet 80 is removed from the web 40 by a knockout device incorporated in the upper punch 78, and dropped through the lower die 79. The sheet 80 is placed on the movable plate 84 in the sheet stacking container 83 under the lower die 79. In the sheet stacking container 83, a sensor monitors a stacked status of the sheet 80. The movable plate 84 is controlled to move down gradually according to a result of the monitoring at the sensor, to regulate a distance from the lower die 79 to the sheet 80.

When a predetermined number of sheets 80 are stacked in the sheet stacking container 83, the container shifter 86 thrusts the slider 87 to transfer the sheet stacking container 83 to the sheet conveyor 88. The sheet conveyor 88 conveys the sheet stacking container 83 containing the sheet 80 to the punching device. Before the container shifter 86 is supplied with a new sheet stacking container, the shutter plates 90 are closed under the lower die 79, where the sheet 80 is retained provisionally. Upon supplying the container shifter 86 with the new container, the shutter plates 90 are opened again to drop the sheet 80 down into the sheet stacking container 83.

The sheets 80 conveyed by the sheet conveyor 88 are taken one by one out of the sheet stacking container 83, and supplied into the punching device. The positioning pins 97 and 101 of the upper punch 92 and the lower die 93 in FIGS. 11A and 11B squeeze the positioning portions 69 to position the sheet 80. The upper punch 92 and the lower die 93 squeeze the sheet 80, where the blades 95, 96, 99 and 100 cut the disks 19 and 20 from the disk-like portions 65 at one time. The disks 19 and 20 from the sheet 80 are sucked through the sucking holes 95a and 96a in the upper punch 92, fetched away from 80, and then stacked together. Dust created by cutting the axial holes 19a and 20a and the retaining holes 25 is exited through the cavities 99a, 100a and 100b in the lower die 93.

In the above embodiment, the mold is disposed under the heating plate. It is possible to dispose a heating plate under a mold. This being so, the web as softened is left to come down by the gravity, to facilitate the contact on the heating plate.

Note that the pointed portions 53 of the chains 52 can be pointed like an acute triangle or like a needle. If each chain is not resistant to the tension applied to the web, each chain can be constituted by two parallel sub-chains for raising force to grip the web. Alternatively the web can be conveyed by use of a device for mechanically gripping upper and lower faces of the web, or by use of a device for sucking and retaining the web.

The above-described embodiment is based on the method of sheet forming, in which a thermoplastic synthetic resin sheet is used for forming disks. The forming is basically the vacuum/air-pressure forming in which compressed air is auxiliary used. The present invention is applicable to disk production in which simple vacuum forming is effected without compressed air. In the present invention, the female mold 58 is used. Should a male mold be used instead, its surface would form an inner face of the disk to contact on the photo film. The male mold would be likely to give a mold mark on the inner face by way of unwanted roughness scratching or influencing the photo film. Thus the use of the female mold 58 is advantageous.

In the present invention, structures other than the above-described photo film cassette may be used. Typical examples usable in the present invention are hereinafter referred to. Of course the present invention is not limited to those examples, but can be combined with any known construction.

The following techniques are used for producing the photo film 14 with a magnetic recording layer: JP-A 6-35118 and 6-17528 and *Bulletin of Disclosed Techniques of the Association of Invention* (Hatsumei Kvokai Kokai Giho) 94-6023 disclose a thermally pretreated thin polyester support, for example, a polyethylene aromatic dicarboxylate type of polyester support as a support of the photo film 14. The polyester support is 50–300 μm thick, preferably 50–200 μm thick, more preferably 80–115 μm thick, and desirably 85–105 μm thick, and is thermally treated or "annealed" for 1–1500 hours under a temperature lower than a glass transition temperature of the polyester support. According to JP-B 43-2603, 43-2604 and 45-3828, ultraviolet rays are applied to the polyester support for the surface treatment. According to JP-B 48-5043 and JP-A 51-131576, surfaces of the polyester support is treated by effecting corona discharge. According to JP-B 35-7578 and 46-43480, the surfaces of the polyester support is treated by effecting glow discharge. According to U.S. Pat. No. 5,326,689, an undercoat is applied to the polyester support. If necessary, an undercoat according to U.S. Pat. No. 2,761,791 is applied to the polyester support. According to JP-A 59-23505, 4-195726 and 6-59357, a coating of particles of strong magnetic material is applied to the polyester support.

As disclosed in JP-A 4-124642 and 4-124645, a layer of the magnetic material may be arranged like stripes. According to JP-A 4-62543, the polyester support is treated for an antistatic characteristic if desired. Finally a coating of silver halide emulsion is applied thereto. JP-A 4-166932, 3-41436 and 3-41437 disclose examples of the silver halide emulsion.

A production managing method of JP-B 4-86817 for photo sensitive material can be preferably used in the production. A data recording method of JP-B 6-87146 can be used for recording the manufacture data. A photo film producing method of JP-A 4-125560 is preferable in a step before or after the production managing step. The film material is cut into the photo film strip with a width smaller than that of the 135 size. Perforations along one of edges are formed so that two of them are associated with each of frames, of which a format is smaller than a frame of a full size of the 135 type.

The strip of the photo film as produced is contained in a cassette, cartridge, patrone or the like to be used: the cartridge package disclosed in JP-A 4-157459; the cartridge depicted in FIG. 9 of JP-A 5-210202 (corresponding to U.S. Pat. No. 5,363,166); and the cassette of U.S. Pat. Nos. 4,221,479, 4,834,306, 5,226,613 and 4,846,418.

The structures of U.S. Pat. Nos. 4,848,693 and 5,317,355 are favorable as cassette in which the leader is pre-contained, in view of light-shielding performance. U.S. Pat. No. 5,296,886 discloses a lock mechanism preferably usable with the cassette. U.S. Pat. No. 5,347,334 discloses an indication preferably to display a degree of use of the photo film in the cassette. The structure of JP-A 6-35123 may be used, in which photo film can be readily loaded in a cassette as soon as the photo film is simply inserted into the cassette.

The photo film cassette can be used for numerous purposes of photography, development and various manners of using photographs, by means of a camera, a photo film processor, and other optical instruments of a photo laboratory. As examples, JP-A 6-8886 and 6-99908 disclose cameras of simple loading types. JP-A 6-57398 and 6-101135 disclose cameras of automatic photo film winding types.

JP-A 6-205690 discloses a camera in which the photo film can be removed during operation of using the photo film for a number of exposures. JP-A 5-293138 and 5-283382 disclose magnetic information recording cameras of a printing aspect ratio selectable type, namely a camera in which information of panoramic photography, wide-vision size photography or normal size photography can be magnetically recorded to photo film. JP-A 6-101194 discloses a camera capable of avoiding double exposures. JP-A 5-150577 discloses a camera capable of externally indicating a used status of photo film.

The photo film after taking exposures is developed by one of automatic photo film processors JP-A 6-222514 and 6-222545. JP-A 6-95265 and 4-123054 disclose methods of magnetic recording on photo film, which methods can be utilized before or after the development. Selection of an aspect ratio according to JP-A 5-19364 can be also used. If the photo film processor is a motion picture photo film type, the method disclosed in JP-A 5-119461 is used for splicing the photo film. When or after the photo film is developed, the photo film is attached or detached according to JP-A 6-148805.

After the photo film processing, the methods of JP-A 2-184835, 4-186335 and 6-79968 may be used for conversion of the photo film information to a printable form to a front face or a back face of color paper. The methods of JP-A 5-11353 and 5-232594 may be used for returning the photo film to a customer with an index print or a returning cartridge.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk producing apparatus for a photo film cassette, said photo film cassette including a spool core on which photo film is wound in a roll form, and a disk having an axial hole, and secured to each of two ends of said spool core being inserted through said axial hole, said disk regulating each of edges of said photo film, said disk producing apparatus comprising:

a web supplier for supplying a web of thermoplastic synthetic resin from a roll of said web;

a web conveyor for conveying said web from said web supplier in intermittent fashion;

a heating plate and a mold, which are disposed to confront with each other, between which said web is conveyed, and which are relatively moved to one another while said web is stopped, for squeezing said web;

an air sucker for effecting air suction of said web through said heating plate and said mold;

an air pressurizer for effecting air pressurization of said web through said heating plate and said mold;

a controller for controlling said air sucker and said air pressurizer; and while said web is squeezed, said controller causing said air sucker to effect said air suction through said heating plate, and also causing said air pressurizer to effect said air pressurization through said mold, so as to soften said web in contact with said heating plate; said controller causing said air sucker to effect said air suction through said mold, and also causing said air pressurizer to effect said air pressurization through said heating plate, so as to form plural disk-like portions on said web being softened according to vacuum/air-pressure forming in contact with said mold;

a cutter device for cutting a portion of said web squeezed between said heating plate and said mold into a sheet; and a punching unit for cutting each contour of said disk-like portions and said axial hole in each of said disk-like portions, to obtain said disk;

wherein said web conveyor includes:

at least one conveyor chain on which said web is placed, and which is rotated for intermittent conveyance of said web; and plural pointed portions arranged in a rotational direction of said conveyor chain and along an edge thereof, for piercing said web, to support said web while preventing said web from being slipped; and wherein said conveyor chain is extended from said heating plate and said mold to said cutter device.

2. A disk producing apparatus as defined in claim 1, wherein said mold has plural disk producing cavities arranged in a matrix, and adapted respectively to forming said disk-like portions.

3. A disk producing apparatus as defined in claim 2, wherein said heating plate is disposed higher than said mold.

4. A disk producing apparatus as defined in claim 2, further comprising plural air passageways formed through said heating plate and adapted to said air suction and said air pressurization of said web, said air passageways respectively having a diameter of 0.3–0.6 mm, and confronting with positions outside said disk producing cavities in said mold.

5. A disk producing apparatus as defined in claim 4, wherein said heating plate has surface roughness of 0.5–20 μm.

6. A disk producing apparatus as defined in claim 4, further comprising a peripheral ridge formed on a periphery of said mold to project toward said heating plate, for squeezing said web in cooperation with said heating plate, to limit a region of said web subjected to said vacuum/air-pressure forming;

wherein said cutter device cuts said sheet away from a portion directly contacted on said peripheral ridge.

7. A disk producing apparatus as defined in claim 6, wherein L is 0–10 mm, where said L is a length at which a periphery of said heating plate extends beyond an outside of said peripheral ridge.

8. A disk producing apparatus as defined in claim 6, further comprising a heater, disposed between said conveyor chain and said web supplier, for heating said web at least partially, to render it easy for said pointed portions to pierce said web.

9. A disk producing apparatus as defined in claim 8, further comprising first and second coolers, disposed before and after said heating plate, for preventing said web from being heated before and after said vacuum/air-pressure forming.

10. A disk producing apparatus as defined in claim 9, further comprising a sheet conveyor for conveying said sheet dropped from said cutter device to said punching unit.

11. A disk producing apparatus as defined in claim 10, wherein said cutter device includes:

a punch, disposed higher than said web, and movable downwards; and a die, disposed under said punch in stationary fashion, and having a die cavity, said die cavity receiving said punch moved downwards, for cutting said sheet from said web, said sheet being dropped through said die cavity.

12. A disk producing apparatus as defined in claim 11, further comprising a sheet stacking unit, disposed under said cutter device, for receiving said sheet dropped from said cutter device;

wherein said sheet conveyor conveys said sheet from said sheet stacking unit toward said punching unit.

13. A disk producing apparatus as defined in claim 12, wherein said at least one conveyor chain comprises two conveyor chains, disposed on respective edges of said web, along said web, and higher or lower than said web, and driven intermittently.

* * * * *